March 8, 1949.   G. N. RUSSEL   2,463,808
FLUSHING SYSTEM FOR WATER STORAGE BASINS
Filed March 16, 1946   3 Sheets-Sheet 2
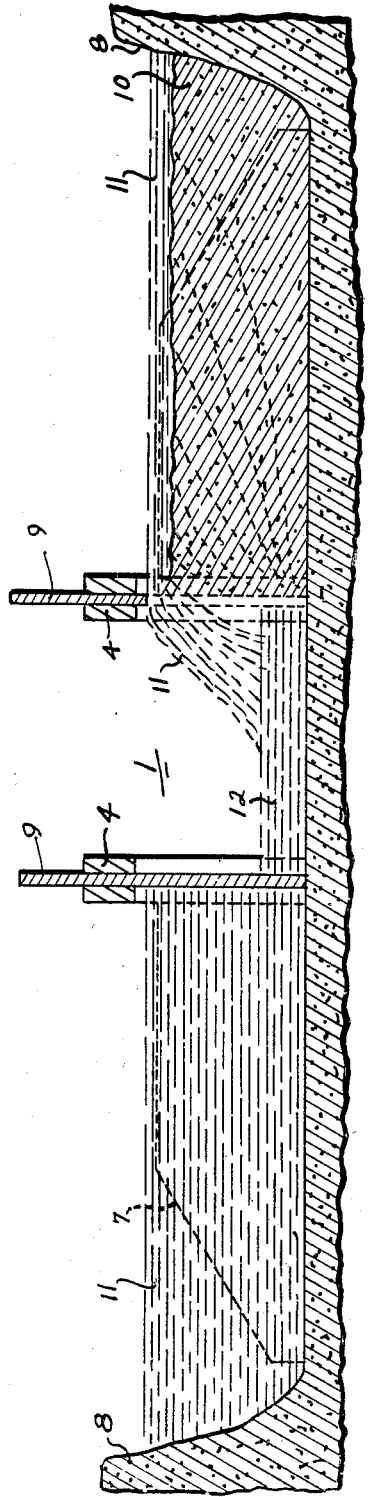
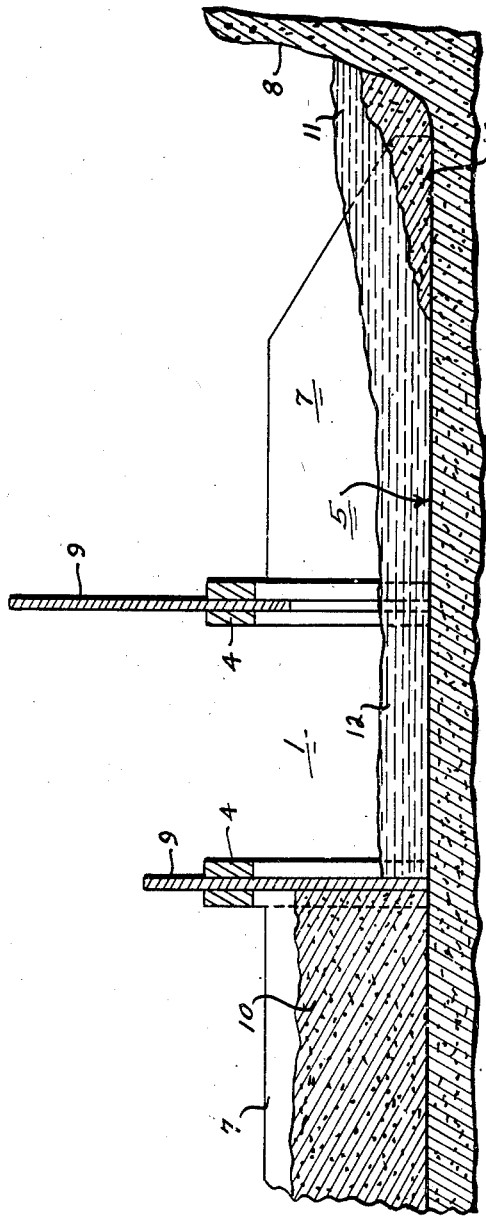
George N. Russel INVENTOR.
BY Loyd J. Miller
ATTORNEY Patented Mar. 8, 1949

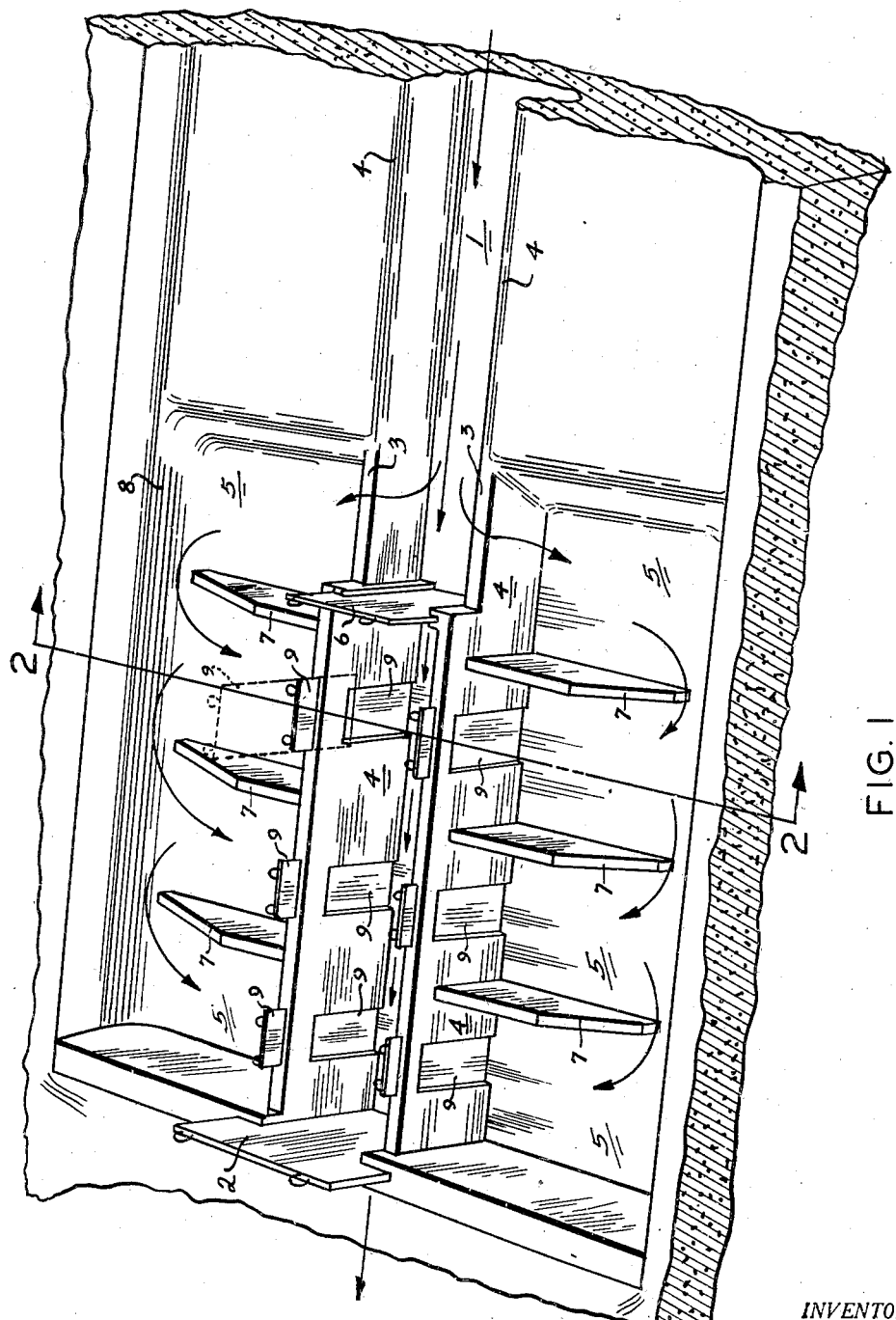

2,463,808

UNITED STATES PATENT OFFICE 2,463,808

FLUSHING SYSTEM FOR WATER STORAGE BASINS

George N. Russel, Piedmont, Okla.

Application March 16, 1946, Serial No. 654,914

4 Claims. (Cl. 61—1)

My invention relates to artificial water storage basins or lakes, and for a system for so controlling the flow of water into and out of such lakes, that silting is controlled.

The practical life span of most artificially formed water storage lakes is usually limited, due to the fact that the lake beds eventually fill up with silt carried in by the stream which supplies the lake.

In artificial lakes from which the public receives its water supply, it is common practice to by-pass flush water which carries a large per cent of silt, but even with the observance of such a precaution, such lakes become valueless from the stand-point of furnishing water to urban communities. When such a lake becomes shallow to the extent that the surface waves disturb the deposited silt, purification becomes so great a problem that in most instances it is better to either abandon the lake or to deepen it by dredging.

It is the principal object of the present invention to provide a system of lake partitions and dams whereby excessive deposit of silt is eliminated entirely, and whereby deposited silt may be flushed or flowed from the lake before it becomes deep enough to give any considerable trouble.

It is a further object of the invention to provide a water flow control system whereby silted lands may be reclaimed, or in some cases may be turned into lake beds.

Other objects will be apparent from the following description when taken in conjunction with the accompanying three sheets of drawings which are schematic in nature and which do not attempt to show actual construction.

Figure 1 is a perspective view of a model which shows diagrammatically the principle of the system;

Figure 2 is a vertical sectional view taken substantially along the line 2—2 of Fig. 1 and illustrating a portion of a lake bed which is excessively silted;

Figure 3 is a similar view illustrating the same portion of the lake bed after it has been flushed or washed out according the the present system.

Like characters of reference designate like parts in all the figures wherein they occur.

In the drawings:

Figure 4:
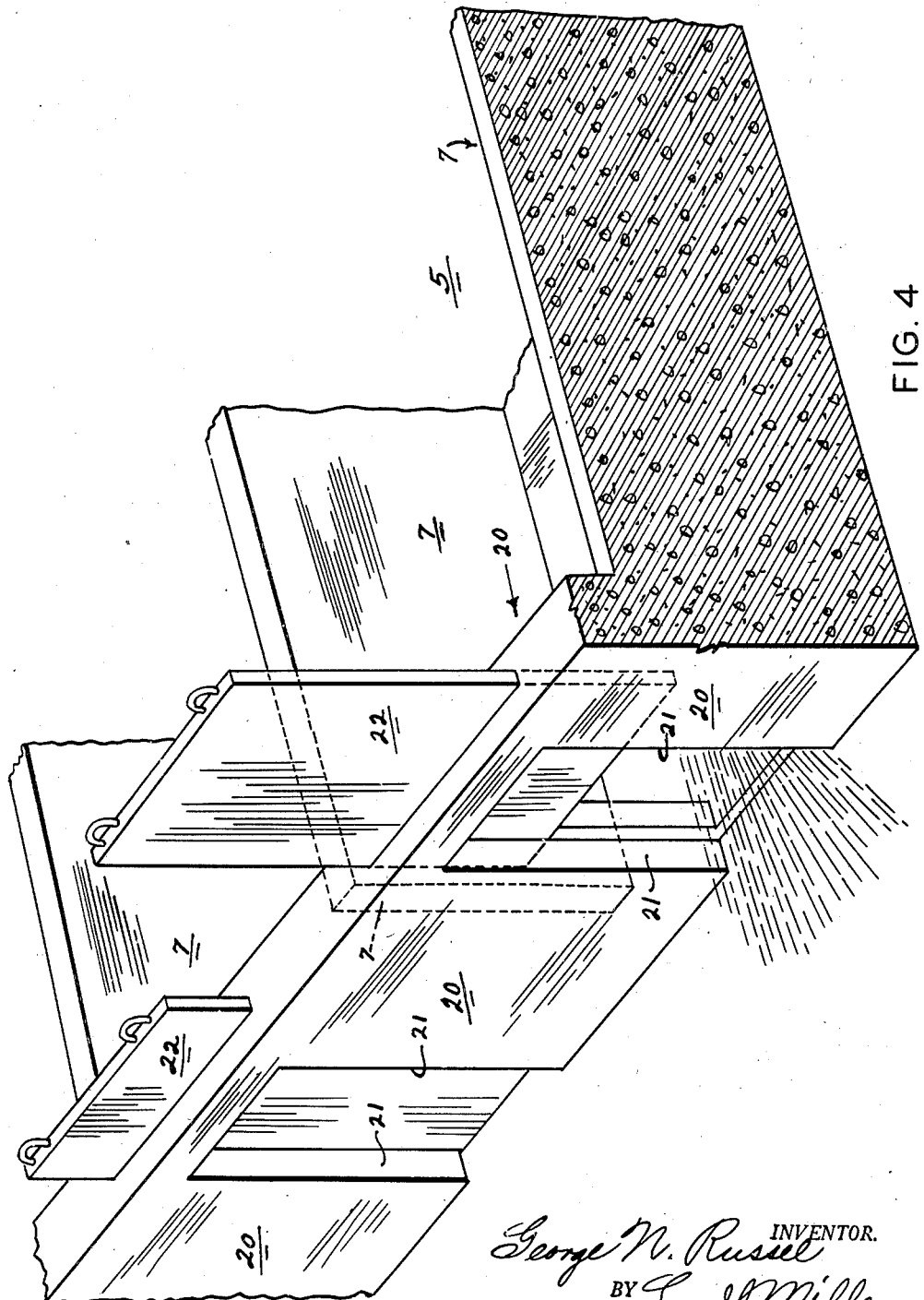
Figure 4 is a perspective diagrammatic view showing a slightly different installation of the flushing system.

The reference numeral 1 indicates as a whole, the channel of a river or stream which supplies water to be diverted into the lake or lakes. The channel 1, as is usual with most artificial supply lake projects, is adapted to be closed by a main gate 2 so that water may be backed up into the channel 1 to such a level that it will flow over a usual spill-way 3 formed in a usual coffer-dam 4, and into the lake basin, which is indicated as a whole by the reference numeral 5.

In the drawings herein, two of such cofferdams and spill-ways are shown lying parallel to the channel 1, so that water may pass over both spill-ways to enter two of the lake basins. Since the present flushing system is identical in principle to each lake which is supplied with water from the channel 1, the following description is made only as the system applies to one lake.

In carrying out the installation of the present system, a primary-gate or lock 6 is established across the channel 1 upstream from the main-gate 2, and immediately down-stream from the lower end of the spill-way. Closure of the primary-gate acts to raise the water level in the channel 1 up-stream from the primary-gate, and to lower the water level in the channel 1 below the primary-gate 6. With the primary-gate closed, water flows over the spill-way 4 into the lake 5.

As stated hereinabove, water entering the lake 5 usually carries a certain amount of silt which is later deposited in the lake basin as the water ceases to travel in a current. In order to flush deposited silt from the basin 1, the following described construction is carried out:

A plurality of spaced vertical walls or partitions 7 are erected, preferably of concrete, with their similar ends all terminating at the cofferdam 4. The walls extend across the lake basin to points adjacent the remote shore line or lake bank 8, and are of a height approximating the high water level in the lake.

A secondary water-gate 9 is provided in the coffer-dam 4 between each adjacent pair of the walls 7, whereby water may be drawn from the lake into the channel between the main-gate and the primary-gate. The walls 7 are spaced apart in sufficient proximity to each other to create a current therebetween when a selected secondarygate 9 is opened, after the primary-gate 6 is closed and after the main-gate 2 is opened to lower the water level therebetween.

In Figure 2 is a typical condition which could be found to exist when the right hand one of the secondary-gates 9 had been left closed over a long period of time. Silt 10 has been gradually deposited in the basin until it is practically up to water level, the water in the basin being indicated by the reference numeral 11. When it becomes desirable to flush or wash the silt 10 from between the two walls 7, the water in the channel 1 is lowered to a level below the top of the opening in the coffer-dam which the gate 9 closes. Such water is indicated by the numeral 12. The gate 9 is then fully opened as shown in Figs. 2 and 3, and the water 11 which then begins flowing into the channel 1 through the gate opening, starts to wash out and to lower the level of the silt 10, as indicated by dotted lines in Fig. 2. Eventually the out-flowing water 11 will flush out all deposited silt between the two walls 7 back to a point even with the right hand ends of the walls. A current will then be created around the ends of the two walls 7 next to the lake bank 8, which current will remove the silt between the two wall ends and the bank 8.

When silt has been removed from between the two walls 7, that specific secondary-gate 9 will be closed and another will be opened so that the flushing operation is repeated between another pair of walls 7.

The lake or basin 5 shown at the left hand side of Fig. 2 appears as it would after the above described flushing operation had been carried out and the lake had been refilled.

Should a proposed artificial lake basin be made in accordance with the above described construction, there would never be any occasion to abandon the lake because of silt deposit, since the silt could be kept out of the lake basin for an almost unlimited period of time.

It is pointed out that there is little or no operating expense in connection with the present flushing system. After the expense of the original installation has been met, the work itself is accomplished entirely by the gravity of the water.

In some water storage basins the stream channel extends along the side of the basin for only a short distance, and therefore the coffer-dam is not sufficiently long to accommodate a plurality of the partitions 7 and secondary-gates 9. In other cases there is no coffer-dam provided, and all water from the stream channel 1 is discharged directly into the lake basin. In such instances there is usually a dam which forms one shore of the basin. In such a case, the present flushing system may be installed in the manner illustrated in Figure 4, wherein:

The reference numeral 20 indicates a dam forming one shore of a water storage lake or basin 5 for storing water 11. A plurality of the partition walls 7 have their similar ends embedded in the dam 20, and the other ends, not shown, of the walls 9 terminate at points adjacent a remote shore or bank of the basin 5. The dam 20 is provided with spaced outlet conduits 21, one of which is disposed between each pair of the walls 7, and each conduit 21 has a water gate 22 for closing the same.

In such an installation of the system, the silt is flushed from the basin, in the manner above described with relation to Figs. 2 and 3, merely by opening desired ones of the gates 22.

It is obvious that some physical changes in the system could and will be made in the system in order to accommodate it to different shapes and sizes of lake basins.

It is understood that the drawings herein are only illustrative of one manner of carrying the system into operation, and I therefore do not wish to be confined to the one embodiment shown and described hereinabove, further than I am limited by the scope of the appended claims.

I claim:

1. In a silt flushing system for water storage basins the combination with a stream channel divided from a water storage basin by a coffer-dam, and a primary water gate for closing the channel and forcing water to flow therefrom into said basin, of: a plurality of spaced upright partitions in said basin and extending from the coffer-dam toward a remote shore line; and a secondary water gate in said coffer-dam downstream from said primary watergate between each pair of partitions for permitting water to flow from the basin to the channel at a point below the primary gate.

2. In a silt flushing system for water storage basins, the combination with a stream channel divided from a water storage basin by a coffer-dam, a spill-way in said coffer-dam for admitting water to the basin from the channel, and with a primary gate in said channel downstream from said spill-way for raising the water level thereabove to force water over said spill-way, of: a plurality of spaced upright partitions in said basin terminating at the coffer-dam and extending therefrom to points adjacent the distant shore line; and a secondary gate between each pair of partitions below the primary watergate for permitting water to return to the channel below the primary gate.

3. In a silt flushing system for water storage basins: a water conduit divided from a water storage basin by a coffer-dam; a spill-way in said coffer-dam for admitting water to the basin from the conduit; a primary gate in said conduit downstream from said spill-way for raising the water level therein to force water over said spill-way; an upright wall in said basin downstream from said gate, said wall terminating at the coffer-dam and extending laterally therefrom to a remote point; and a secondary gate in said coffer-dam downstream from said wall for permitting water to return to the channel at a point below the wall.

4. In a water control system for streams, the combination with a straight main channel: of a gate for closing said channel; means up-stream from said gate for permitting water to flow into a basin when said gate is closed; a plurality of partitions dividing the basin into potential lateral channels leading to said main channel downstream from said gate; and a gate in said coffer-dam between each pair of partitions for selectively closing each of said lateral channels.

GEORGE N. RUSSEL.

REFERENCES CITED

The following references are of record in the file of this patent:

UNITED STATES PATENTS

| Number | Name | Date |
| --- | --- | --- |
| 1,431,367 | Buchli | Oct. 10, 1922 |
| 1,434,337 | Greenfield | Oct. 31, 1922 |